United States Patent
Blumenthal et al.

(10) Patent No.: US 9,521,390 B2
(45) Date of Patent: *Dec. 13, 2016

(54) SYSTEM AND METHOD FOR ADAPTIVE SCALABLE DYNAMIC CONVERSION, QUALITY AND PROCESSING OPTIMIZATION, ENHANCEMENT, CORRECTION, MASTERING, AND OTHER ADVANTAGEOUS PROCESSING OF THREE DIMENSIONAL MEDIA CONTENT

(71) Applicant: Stephen Blumenthal, Newfield, NY (US)

(72) Inventors: Stephen Blumenthal, Newfield, NY (US); Ilya Sorokin, New York, NY (US); Edmund Mark Hooper, Pointe-Claire (CA)

(73) Assignee: Stephen Blumenthal, Newfield, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/054,772

(22) Filed: Oct. 15, 2013

(65) Prior Publication Data
US 2014/0044403 A1  Feb. 13, 2014

Related U.S. Application Data

(63) Continuation-in-part of application No. 12/642,757, filed on Dec. 18, 2009, now Pat. No. 8,558,830, and a
(Continued)

(51) Int. Cl.
*H04N 13/00* (2006.01)

(52) U.S. Cl.
CPC ...... *H04N 13/0018* (2013.01); *H04N 13/0003* (2013.01); *H04N 13/0055* (2013.01); *H04N 13/0059* (2013.01)

(58) Field of Classification Search
USPC ......................................... 345/419, 581, 619
See application file for complete search history.

(56) References Cited

U.S. PATENT DOCUMENTS 6,765,568 B2 * 7/2004 Swift et al. ................... 345/419
2008/0281566 A1 * 11/2008 Wang et al. ...................... 703/7

* cited by examiner

*Primary Examiner* — Ke Xiao
*Assistant Examiner* — Jed-Justin Imperial

(57) ABSTRACT

In at least one embodiment thereof, the inventive system and method are directed to providing and configuring a novel platform-independent 3D content media container operable to: (1) support and store a 3D content media file with at least one 3D content modification/improvement technique applied to only specific predetermined portions thereof, and (2) selectively enabling particular optimal 3D content-related parameter settings for future application of at least one additional 3D content modification/improvement technique, to likewise be associated with one or more specific corresponding 3D content media file portion(s), and to also be stored in association therewith in the inventive 3D content media container. In at least one additional embodiment thereof, the inventive system and method are capable of determining and implementing various storage, transmittal, and application(s) of 3D content media processing/settings/parameter/profile configuration(s) prior to, or during, display of corresponding 3D content media.

19 Claims, 6 Drawing Sheets

Related U.S. Application Data continuation of application No. 13/168,252, filed on Jun. 24, 2011, now abandoned, which is a continuation-in-part of application No. 12/642,757, filed on Dec. 18, 2009, now Pat. No. 8,558,830.

(60) Provisional application No. 61/138,926, filed on Dec. 18, 2008.

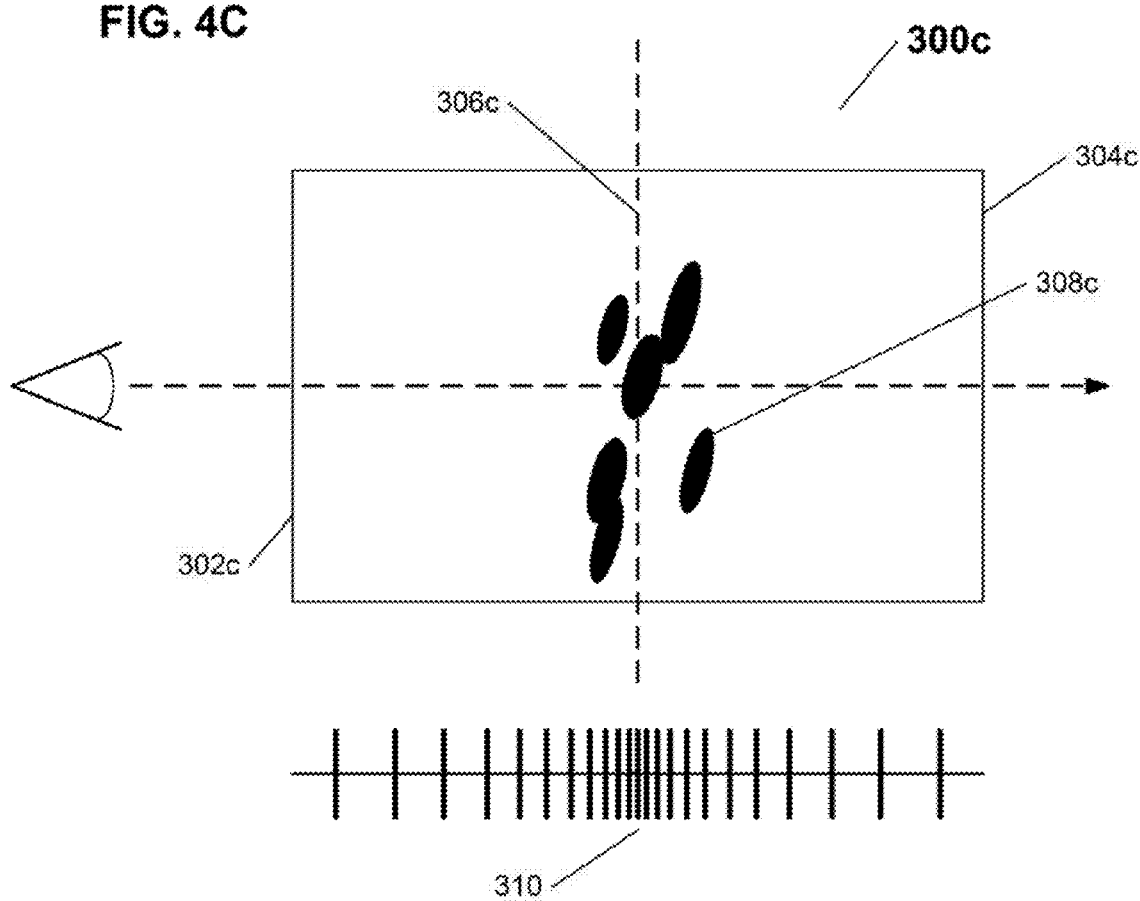

SYSTEM AND METHOD FOR ADAPTIVE SCALABLE DYNAMIC CONVERSION, QUALITY AND PROCESSING OPTIMIZATION, ENHANCEMENT, CORRECTION, MASTERING, AND OTHER ADVANTAGEOUS PROCESSING OF THREE DIMENSIONAL MEDIA CONTENT

CROSS REFERENCE TO RELATED APPLICATIONS

The present patent application is a continuation-in-part of, and claims priority from, the commonly assigned co-pending U.S. patent application Ser. No. 12/642,757 entitled "System and Method For Adaptive Scalable Dynamic Conversion, Quality and Processing Optimization, Enhancement, Correction, Mastering, And Other Advantageous Processing of Three Dimensional Media Content", filed Dec. 18, 2009, which in turn claims priority from the commonly assigned U.S. Provisional Patent Application Ser. No. 61/138,926, entitled "System and Method For Adaptive Scalable Dynamic Conversion, Quality and Processing Optimization, Enhancement, Correction, Mastering, And Other Advantageous Processing of Three Dimensional Media Content", filed Dec. 18, 2008. The present application is also a continuation of, and claims priority from the commonly assigned co-pending U.S. patent application Ser. No. 13/168,252 entitled "System and Method For Adaptive Scalable Dynamic Conversion, Quality and Processing Optimization, Enhancement, Correction, Mastering, And Other Advantageous Processing of Three Dimensional Media Content", filed Jun. 24, 2011, which in turn claims priority from the commonly assigned co-pending U.S. patent application Ser. No. 12/642,757 entitled "System and Method For Adaptive Scalable Dynamic Conversion, Quality and Processing Optimization, Enhancement, Correction, Mastering And Other Advantageous Processing of Three Dimensional Media Content", filed Dec. 18, 2009, which in turn claims priority from the commonly assigned U.S. Provisional Patent Application Ser. No. 61/138,926, entitled "System and Method For Adaptive Scalable Dynar is Conversion, Quality and Processing Optimization, Enhancement, Correction, Mastering, And Other Advantageous Processing of Three Dimensional Media Content", filed Dec. 18, 2008.

FIELD OF THE INVENTION

The present invention relates generally to systems and methods for improving the 3D experience provided by playback and display of 3D media content, and more particularly to systems and methods for providing 3D content mediacentric solutions that greatly improve the quality and impact and other desirable features of any 3D media content, while decreasing the required levels of computing power, and lowering the complexity of the necessary 3D media playback and 3D media display solutions, thus maximizing the 3D experience produced therefrom.

BACKGROUND OF THE INVENTION

Various tools for capturing, generating, processing, playing back and displaying three dimensional (3D) content media (especially motion video), have been available for quite some time. Display technologies for 3D content media in particular have evolved quite a bit from the earliest barely passable offerings which required the audience to wear flimsy "glasses" provided with a different (red or blue) lens for each eye, to more advanced electronic "stereoscopic 3D" glasses equipped with remotely triggered liquid crystal display (LCD)-based lenses (acting as alternating individually controlled "shutters"), which provided its wearers with an engaging and quality "3D experience", given properly prepared 3D content media paired with the appropriate playback and corresponding display technologies working on conjunction with the 3D glasses.

However, this approach for providing a "3D experience" is quite cumbersome and very expensive to use and maintain, and has thus been of very limited commercial success, primarily being relegated to special entertainment venues, such as certain IMAX theaters and high-end amusement parks. In addition to expensive, and relatively fragile, glasses being required for each member of the audience (which in some cases excludes those who cannot comfortably wear them), the latest stereoscopic 3D solutions require sophisticated and expensive computer-based components for storing and processing the 3D content, as well as similarly complex and expensive electronic components for displaying the 3D content and remotely controlling the stereoscopic 3D glasses.

Of course, as is expected, the very limited availability and expense of the above 3D content media playback and display technologies, in particular, have led to a relative lack of interesting 3D content (due to the expense in its creation and the very limited commercial interest therein), which in turn has resulted in a very limited availability of 3D content capture and processing tools, thus essentially resulting in a "vicious cycle".

Nonetheless, in recent years, there has been a revolutionary leap in the solutions being offered for displaying 3D content media. Specifically, a number of companies, have developed and offered flat panel displays of varying sizes capable of creating a virtual 3D experience for the viewer without the need for the viewer to wear electronic or other types glasses or similar devices. Moreover, these displays do not require other specialized equipment and can work with specially configured 3D content that may be stored on, and played back from, conventional readily available computers. And, while these displays are still quite expensive, they are priced within reach of most organizations (and within reach of some consumers), with the price certainly poised to decrease exponentially, commensurate with an increase in production (as has been the case with the HDTV flat panel display market).

Therefore, for the past several years, ever since these newest stand-alone 3D ("SA-3D") content media display technologies have become available at relatively reasonable prices, there has been a widespread consensus that proliferation of three-dimensional (3D) content media (both in entertainment and in advertising), as well as of the hardware and software technologies necessary for SA-3D content capture, processing, playback, and display, is inevitable, and that the market for 3D-related technologies will experience explosive growth.

Nevertheless, to date there has not been a dramatic push forward that would make the above predictions become reality. One of the main reasons for this aforementioned lack of the expected proliferation of commercially successful SA-3D-related content, software and hardware offerings, is the fact that although these newest SA-3D content media display technologies have a number of very significant advantages over all previously known 3D-related offerings, they also suffer from a number of flaws. Specifically, on the average, the quality and impact of the 3D experience delivered by the available SA-3D solutions is lower than that of conventional high-end glasses-based stereoscopic 3D offerings. Moreover the relative position of each viewer to the SA-3D screen (in terms of vertical and horizontal viewing angles, distance, etc.) has significant impact on that viewer's overall 3D experience when viewing the displayed SA-3D content. Moreover, the existing SA-3D hardware and software solutions for the capture, processing, playback and display of 3D content media have focused on areas of expertise, offer individual and discrete benefits in various narrow aspects of 3D and SA-3D technologies with little or no regard for the offerings of other solution providers, resulting in literally dozens of incompatible proprietary software and hardware products with nothing to tie them together.

It would thus be desirable to provide a system and method directed to one or more modular unifying scalable solutions, preferably implemented in a configurable infrastructure, that greatly improve the quality and impact of any 3D media content, while decreasing the required levels of computing power, and lowering the complexity of the necessary playback and display solutions. It would further be desirable to provide a system and method capable of achieving the above goals by selectively performing 3D content processing and/or settings/parameter configuration at one or more components of the infrastructure from 3D content capture to 3D content media display. It would moreover be desirable to provide a system and method capable of determining and implementing selective or optimal storage, transmittal, and application(s) of 3D content processing/settings parameter/profile configuration(s) prior to display of corresponding 3D content media to one or more viewers thereof.

BRIEF DESCRIPTION OF THE DRAWINGS

In the drawings, wherein like reference characters denote corresponding or similar elements throughout the various figures:

FIGS. 4A-4D are various views of a schematic representation of an exemplary 3D media content volume structure that may be utilized in conjunction with various embodiments of the present invention of FIGS. 1 to 3, and illustrate a varying 3D spatial volume which contains at least one object of interest to the viewer of the 3D media content displayed therein.

SUMMARY OF THE INVENTION

Figure 1:
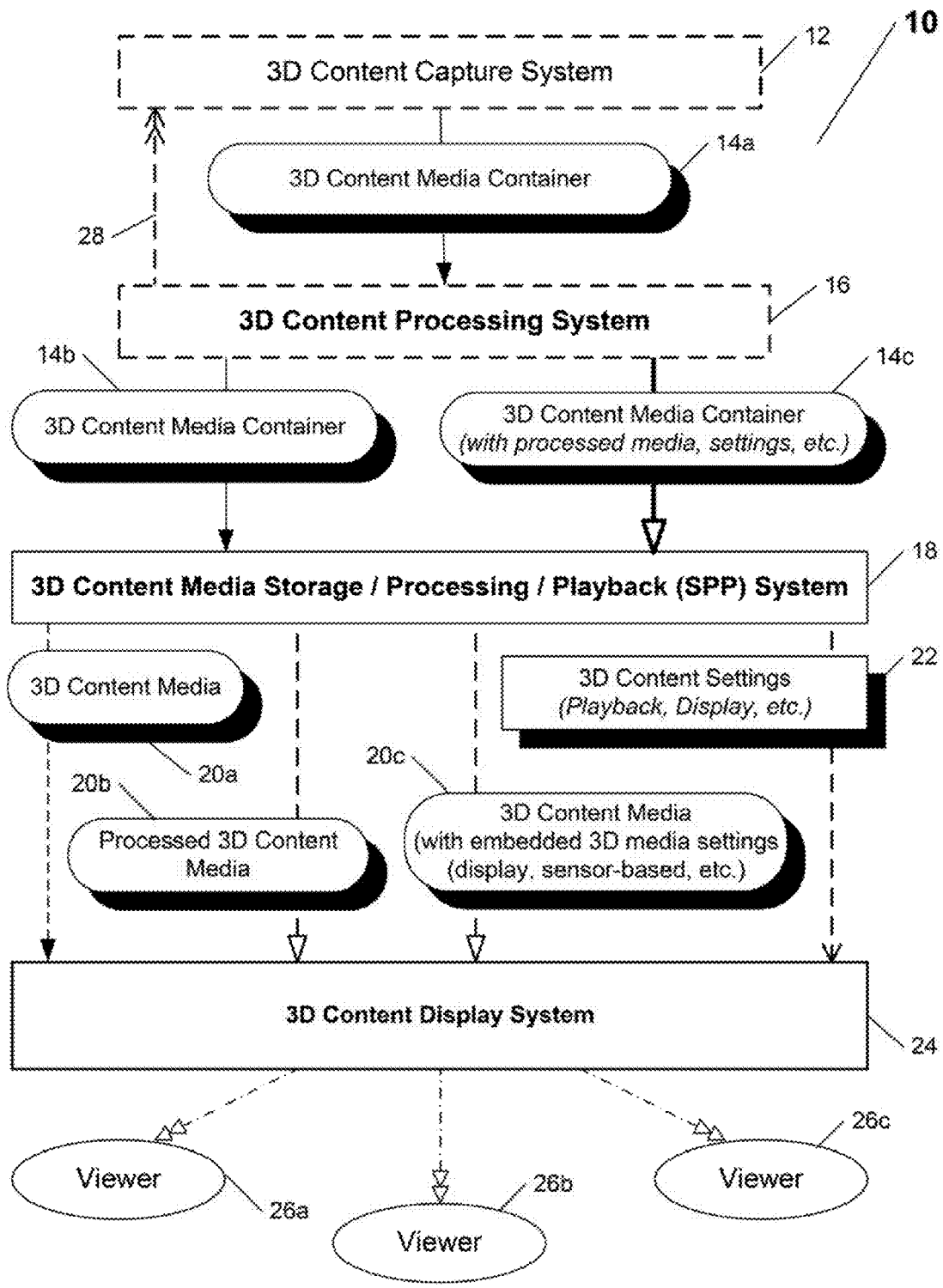
FIG. 1 is a schematic block diagram of an exemplary embodiment of the inventive scalable modular infrastructure for selectively implementing, configuring, and managing various components of the inventive system for selectively providing adaptive scalable modular functions related to 3D content media capture, generation, quality/processing optimization, enhancement, correction, mastering, and other advantage s processing and/or configuration.

The present invention is directed to a system and method for providing 3D content-centric solutions that greatly improve the quality and impact of 3D media content, while decreasing the required levels of computing power, and lowering the complexity of the necessary 3D media playback and display solutions, thus maximizing the 3D experience produced therefrom. The novel system and method accomplish these goals by providing modular unifying scalable 3D content-centered solutions, preferably implemented in a configurable infrastructure, that improve the quality and impact of any 3D rrredia content, while decreasing the required levels of computing power, and lowering the complexity of the necessary playback and display solutions.

The inventive system and method advantageously enable automatic, semi-automatic or user-controlled selective performance of 3D content processing and/or settings/parameter configuration at one or more components of the infrastructure (from 3D content capture, to 3D content processing (and/or 2D to 3D content conversion), and to 3D content media display), and in at least one embodiment thereof, the inventive system and method are capable of determining and implementing selective or optimal storage, transmittal, and application of 3D content processing/settings/parameter/profile configuration(s) prior to, or during, display of corresponding 3D content media to one or more viewers thereof.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The system and method of the present invention, address all of the disadvantages, flaws and drawbacks of all previously known 3D-related hardware and software offerings, by providing novel 3D content media-centric solutions that greatly improve the quality and impact of any 3D media content, while advantageously decreasing the required levels of computing power, and lowering the complexity of the necessary 3D media playback and 3D media display solutions, thus maximizing the 3D experience produced therefrom for one or more viewers.

The novel system and method accomplish the above goals by providing modular unifying scalable 3D content-centered solutions, preferably implemented in a configurable infrastructure, that greatly improve the quality and impact of any 3D media content, while decreasing the required levels of computing power, and lowering the complexity of the necessary playback and display solutions.

In various exemplary embodiments thereof, the inventive system and method advantageously enable automatic, semi-automatic or user-controlled selective performance of 3D content processing and/or settings/parameter configuration at one or more components of the infrastructure (from 3D content capture to 3D content media display), and in at least one embodiment thereof, the inventive system and method are capable of determining and implementing selective or optimal storage, transmittal, and application(s) of 3D content processing/settings/parameter/profile configuration(s) prior to display of corresponding 3D content media to one or more viewers thereof.

It should be noted that current 3D media content capture, processing, playback and display solutions take the "lowest common denominator" approach to applying playback/display optimization and related settings (intended to improve the appearance, quality, impact and overall "3-D Experience") to the 3D content media being displayed to at least one viewer thereof. This is very problematic because the desirable settings and parameters, as well as the necessary processing power and other requirements, for optimizing and maximizing the quality, impact and overall 3-D experience level for any displayed 3D media content, vary greatly between different 3D content media files, and even between different segments/portions within any particular 3D content media file itself. In particular, these variations largely depend on the specific 3D scenes being shown (i.e., on the depicted objects/subjects, their relative motion, complexity, backgrounds, lighting, etc.), and on other external factors, such as the original 3D content capture and/or conversion parameter settings, the capture hardware used, the current display, and even on the viewers' relative position (orientation, elevation, distance, etc.) thereto.

Finally, prior to discussing the various embodiments of the present invention in greater detail below, it is important to note that while many of the embodiments of the present invention (and the various novel tools, techniques and processes relating thereto), are described and discussed as being implemented and/or utilized in the field of 3D visual entertainment (film, television, games, etc., all embodiments of the inventive system and method, can be readily and advantageously utilized in virtually any scientific, military, medical, forensic, or industrial application based on, or involving 3D visualization or display and/or manipulation of 3D content medial, as a matter of design choice, without departing from the spirit of the invention.

Referring now to FIG. 1, an exemplary embodiment is shown of an inventive scalable modular infrastructure 10 for selectively implementing, configuring, and managing various components of the inventive system for selectively providing adaptive scalable modular functions related to 3D content media capture, generation, quality/processing optimization, enhancement, correction, mastering, and other advantageous processing and/or configuration.

The infrastructure 10 includes optional components 12 and 16 (3D content capture system 12, and 3D content processing system 16) for selectively capturing and optionally processing 3D content media prior to placing it into a 3D content media container (e.g., file, stream, etc.). The infrastructure 10 also includes a 3D content media storage/processing/playback SPP system 18, operable to selectively store, process, and/or play back 3D content media from a medial container that may be received from components 12 and/or 16, or that may be delivered from another 3D content media source (such as media converted from another 3D format, or from non-3D content source).

The SPP system 18 preferably communicates with a 3D content display system 24, operable to display 3D content media (in one or more configurations, and capable of displaying/utilizing at least one of: unprocessed 3D content media 20a, processed 3D content media 20b, optimized 3D content setting for use with other 3D media content received from a source outside of the infrastructure 10, etc.) to at least one viewer (e.g., to viewers, 26a-26c).

In at least one embodiment of the present invention, the 3D content processing system 16 may also optionally comprise at least one 3D content processing feature/function that is optimized for utilization in conjunction with the 3D content capture system 12. For example, in one embodiment of the infrastructure 10, the 3D content capture system 12 may actually be a conventional or a modified 3D content capture system, that is provided with additional necessary features (such as scene/visual field depth mapping (or equivalent capabilities) to enable dynamic (and optionally "on the fly") capture of 2D content, plus sufficient depth (and/or related non-image) information that is sufficient to enable the systems 12 and 16 to produce desirable 3D content for delivery to the SPP system 18. An exemplary embodiment of operation of the infrastructure 10 is discussed in greater detail in conjunction with FIG. 3.

Figure 2:
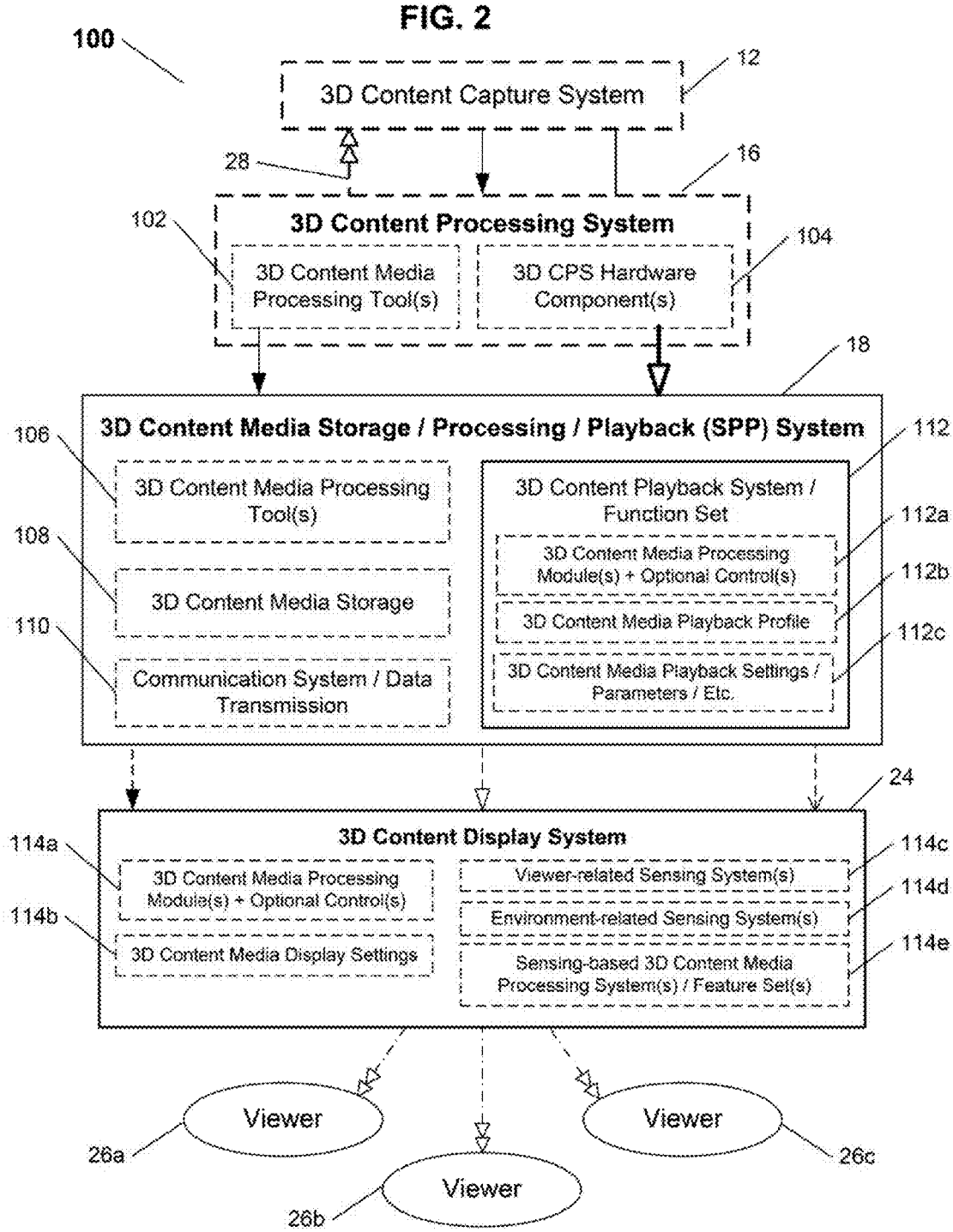
FIG. 2 is a schematic block diagram of exemplary embodiments of various components of the inventive system for selectively providing adaptive scalable modular functions related to 3D content media capture, generation, quality/processing optimization, enhancement, correction, mastering, and other advantageous processing and/or configuration, that may be implemented in the novel infrastructure of FIG. 1.

Referring now to FIG. 2, various exemplary embodiments of the possible components of an inventive system 100, that may be implemented in the inventive infrastructure 10 of FIG. 1, operable to selectively provide adaptive scalable modular functions related to 3D content media capture generation, quality/processing optimization enhancement, correction, mastering, and other advantageous processing and/or configuration, that may be implemented in the novel infrastructure 10 of FIG. 1. Preferably, one or more of the components (12, 16, 18, and 24), and subcomponents (102 to 114e) of the inventive system 100, are capable of performing one or more steps of an exemplary novel process 200 of FIG. 3.

Figure 3:
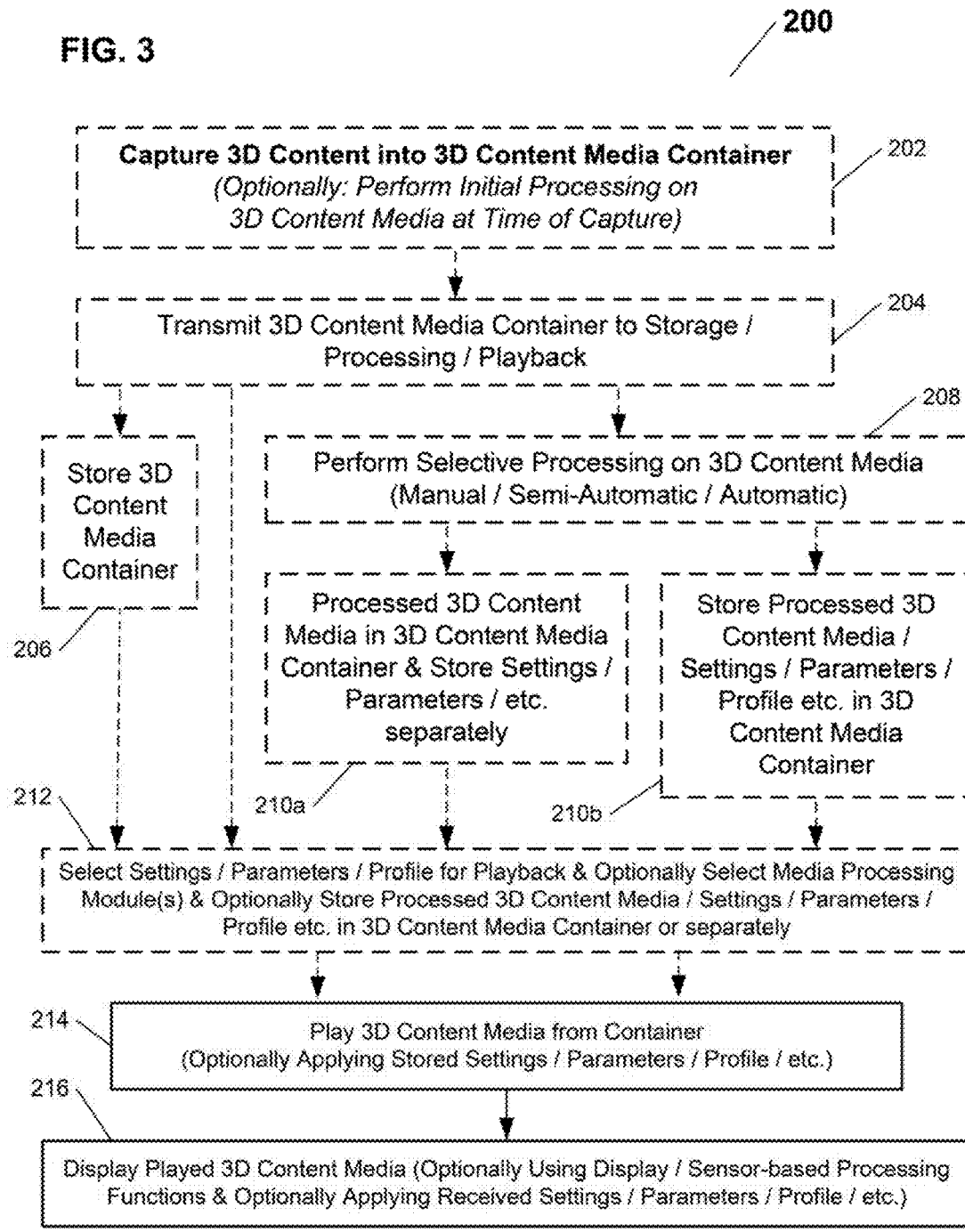
FIG. 3 is a process flow diagram of an exemplary embodiment of the inventive process, that may be performed in whole, or selectively in part, by at least one component of the inventive system of FIG. 2, or that may otherwise be implemented in one or more components of the novel infrastructure of FIG. 1.

Referring now to FIG. 3, an exemplary embodiment is shown as a process flow diagram of an exemplary embodiment of the inventive process, with steps 202 to 216, that may be performed in whole, or selectively in part, by at least one component of the inventive system 100 of FIG. 2, or that may be implemented in one or more components of the novel infrastructure 10 of FIG. 1.

In summary, the inventive system 100 (through selective operation of one or more components thereof, as may be implemented in infrastructure 10 of FIG. 1), in additional exemplary embodiments thereof, preferably associates at least one predetermined 3D content improvement ("3DCI") parameter set (optimization playback, and/or display settings and/or parameters, selection of one or processing modules and/or stages of use thereof (or example during one or more of: capture, post-processing, playback or display), display tool adjustments, etc.), with 3D media content containers.

In at least one embodiment thereof, the optimal 3DCI parameter set comprises a plurality of "static to dynamic" display tools adjustments, which may be advantageously recorded and/or otherwise embedded in the 3D content media file, to thereby become a permanent feature thereof during later playback and/or processing (e.g., post production, etc.) of the 3D content media. In another embodiment of the present invention, the optimal 3DCI parameter set integration technique may also be utilized as a playback feature which is interpreted by a proprietary software and/or hardware 3D media player (which, by way of example can be configured as a "set top box" or equivalent, for 2D to 3D content conversion, playback of "enhanced" 3D content media having an integrated 3DCI parameter set, and for other functions (such as utilization of de-encryption solutions for playback of protected 3D content media.

Advantageously, this association and/or linking, occurs on a scalable basis from the most basic level at which an optimal 3DCI parameter set is associated with one or more corresponding 3D content media containers (that may be in a container directory, a playlist, a queue, or in a similar storage container), such that the appropriate 3DCI parameter set is activated in conjunction with its corresponding 3D content media from the container being played, to a more advanced level at which different 3DCI parameter sets are associated with (or otherwise linked or assigned to), the appropriate different portions of each 3D content media container, such that during playback and/or display thereof, different sections of the displayed content receive the optimal level of "treatment".

In one exemplary embodiment of the present invention, the above-described techniques may be readily implemented in a media player (e.g., software based or otherwise), operable to process and play back a 3D media content clip, and which is operable to enable an operator thereof to (1) exercise full control over adjustments to 3DCI parameters on a scalable/variable granularity basis (ranging from a portion of a single content frame to a scene formed from a plurality of sequential frames, and (2) embed various settings and parameters (e.g., even data points of DCT (discrete cosine transform) settings), and automatically imbed them in the 3D media content clip for later optimized playback.

Advantageously, the novel media player is further operable to enable the operator to run a 3D media content clip, stop at a particular frame, apply predefined (e.g., DCT) adjustments and record them in the clip, such that the adjustment is automatically carried forward through the clip until the operator tops at a the next frame which requires a different adjustment, or the clip ends.

The novel system and method advantageously address and cover both the creation/determination/configuration of various scalable 3DCI parameter sets during 3D content capture, during initial processing, at any other time up to and including on-the-fly during playback, or any combination of the above, as a matter of design choice without departing from the spirit of the invention. Similarly, the process of creation/determination/configuration of the 3DCI parameter sets can be wholly or partially automated, or can be manually performed as a "creative process" by one or more content professional, preferably utilizing one or more 3DCI tools and support modules as desired or as necessary.

For example, tools utilizing novel dynamic and adaptive variable 3D depth and layering techniques of the present invention (i.e., Depth Based Image Rendering or "DBIR" techniques), may readily be used for both automated and content professional-directed 3DCI parameter creation (e.g., the 3DCI may include desired depth adjustment parameters, variable layer densities centered on certain displayed objects or object types, dynamic variable resolution based on relative distance of the closest object depth layers to the viewer, etc.).

The 3DCI parameter sets ray be linked to, or otherwise associated with the respective 3D content media containers (or portions thereof), and may thus be stored in dedicated or other form of files, containers or libraries, separately from the 3D content media containers, or may be stored within the 3D content media containers, (e.g., embedded therein, as discussed above).

The inventive system 100 (through selective operation of one or more components thereof, as may be implemented in infrastructure 10 of FIG. 1, for example in accordance with the process 200, or otherwise) in various additional exemplary embodiments thereof is operable to provide selective, automatic, or user-controlled dynamic adaptive/scalable utilization of layered depth measurement/mapping (e.g., DBIR) techniques in 3D content media, coupled it) with techniques for identifying and spatially (3D) tracking static and moving displayed objects in the depth mapped layered scenes to provide the desired optimal level of at least one predefined aspect of 3D content experience.

In various exemplary embodiments thereof, the system and method of the present invention advantageously comprise the utilization of at least one of (and preferably both) the following novel 3DCI methodologies (that may be implemented utilizing one or more of various suitable 3D content processing techniques): (1) Dynamic Volumetry, and (2) Viewer Perception Enhancement, each described in greater detail below.

When presenting 3D content using a digital display or a projector, the challenge is not only to separate the elements of the content into a spatial continuum ranging from foreground to background, but also to reproduce correctly the viewer perspective that would naturally proceed from the action on screen. This is true for both content originally captured in 3D and for content converted from an original 2D source.

When presented with a visual field containing many objects, the observer will isolate the objects and focus on a specific one or few in order to better interpret the action within the field. The process of separation is based on many criteria/properties such as colour, brightness and relative motion. Once the objects have been separated, the observer's primary focus is chosen. Following that choice, a different set of perceptual algorithms is used to track the action within the scene. The centre of interest is maintained in tight focus and other elements of the image which are closer, farther or moving at a different rate are defocused. Thus, in order to improve the 3D effect of any digital display, the system used must not only manage the correct definition of varying spatial relationship between image elements, it must also generate the presentation in accord with the environmental conditions of the display and the perceptual expectations of the viewer.

Essentially, there are two broad categories of activity that take place within any 2D-to-3D video transformation pipeline:

(A) Conversion: Development of a series of data which describe the calculated XYZ position of picture elements present within each frame of the video; and (B) Presentation: A mathematical process that shows the viewpoint of picture elements from different perspectives. (For example: Two views are required for stereoscopic and 9 or more for ASD presentations).

Each of the above activities is performed at a different time & place. Conversion is a complex process, typically performed one time only for any given piece of content, whether live or off-line. The conversion process is usually performed in a studio or using a separate real-time technology module (in the case of live conversion). The Presentation processes involve different calculations that are performed at each viewing time on equipment located at the viewing position. In addition to the methods required to reproduce the basic sub-images inherent to the 3D presentation technology, the images must be adjusted according to viewer and site-based parameters such as specific output technology, venue physical format, ambient light conditions and viewer position/preference.

Figure 4A:
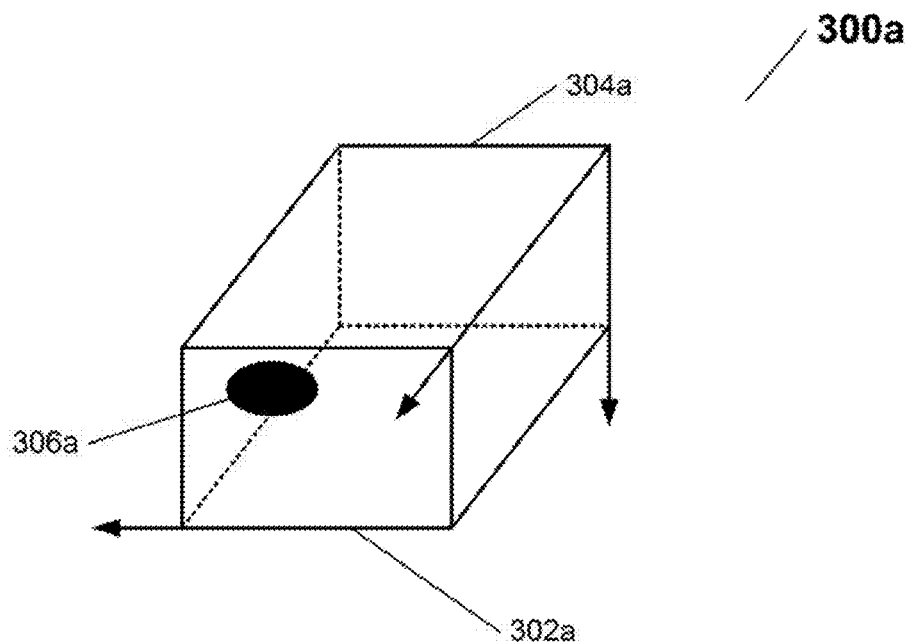
Figure 4B:
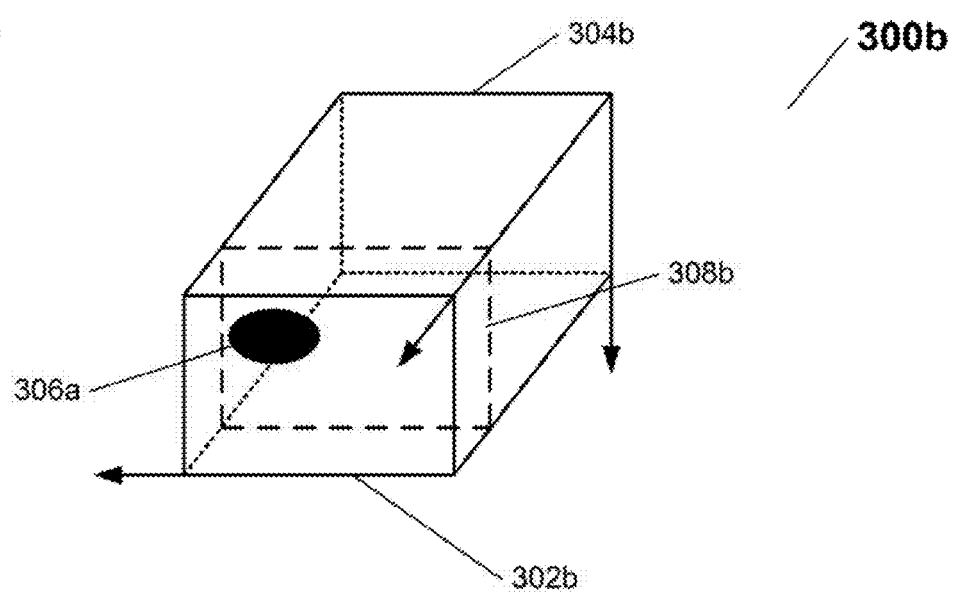
Figure 4D:
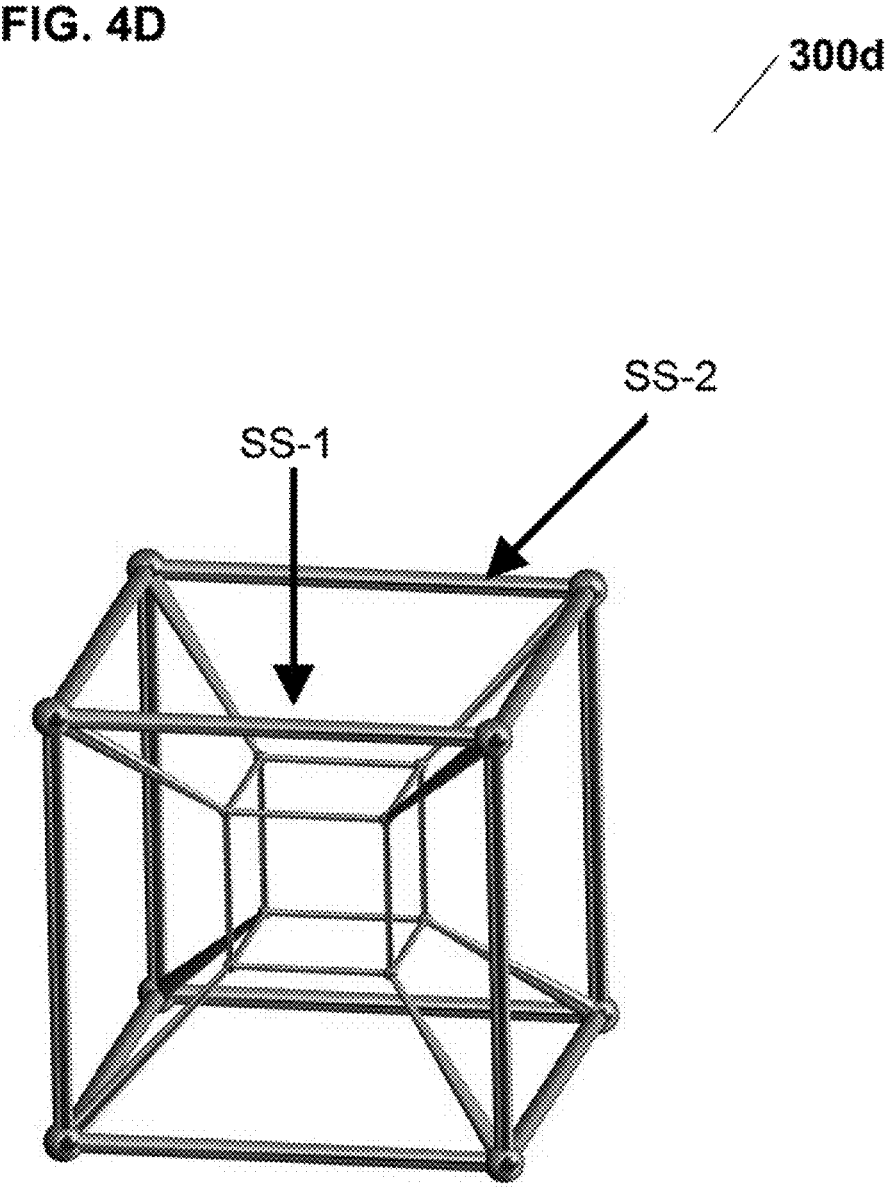

Dynamic Volumetry refers to the process of adjusting the generation of the 3D images to compensate for the parameters related to the spatial relationship between elements within a series of images comprising one or several 3D scenes. Referring now to FIGS. 4A to 4D, an exemplary embodiment of the inventive Dynamic Volumetry methodology is shown. FIGS. 4A to 4D show varying volumetric 3D spaces 300a-300d, which contain a range of objects of interest 306a to 306c arranged from foreground to background. At different times in the video sequence, the volume or scale on any or all of the axes will change to allow a reasonable discrimination of the objects of interest. Additionally, the system performs the sub-image generation with a focus set in a plane containing the centre of perceived action. FIG. 4A shows a spatial volume ranging from foreground 302a to background 304a and including an object of interest 306a FIG. 4B shows a Perception Focus Plane 308b At $T_0$ and a Primary object of Interest (Perception Focus) 306b. The positioning of the focus plane is dynamically adjusted to center on the objects or zone with maximum relation to the action within the image sequence thus permitting the system to display the greatest degree of 3D separation.

FIG. 4C shows a side view of 3D space and Primary object of Interest 306c. (Perception Focus). Spatial data information can be linear across the space (foreground to background) or non-linear thus permitting the system to display the greatest degree of 3D separation around the area of maximum interest or action.

FIG. 4O shows Scene Space at $T_0$ (SS-1) to Scene Space at $T_{0+n}$ (SS-2). The volume of the space is adjusted dynastically to allow the background and foreground to be imaged in such as way as to always include or exclude the zone of maximum interest with the greatest degree of 3D separation.

Presentation processes involve different calculations that are performed at each viewing time on equipment located at the viewing position. In addition the methods (described above) required to reproduce the basic sub-images inherent to the 3D presentation technology, the images must be adjusted according to viewer and site-based parameters such as specific output technology, venue physical format, ambient light conditions and viewer position/preference.

The inventive system and method dynamically modifies a series of coefficients/formulae affecting the presentation rendering of a data file containing and describing the sub-elements of an image sequence (video stream) in such a way as to emulate the natural interest and perception of a view when exposed to a real environment. The modifications may be based on variables such as the following:
Environment Specific:
Viewer position
Ambient lighting
Presentation equipment technology
Content Specific:
Foreground/background separation
Primary activity focus position
Overall scene topography
Topography of preceding and following scenes
Dynamic adjustments will be at frame speed and may impose specific adjustments for a single scene, a single frame, or an interpolated sequence of adjustments including linear and non-linear transforms between specified points of interest, whether scene-based or not.

Advantageously, in accordance with the present invention, the novel system 100 preferably comprises sufficient hardware and/or software components and subcomponents to provide and utilize one or more of the following advantageous and novel functionalities/techniques which are contemplated by the present invention in implementing various embodiments and aspects of the inventive Dynamic Volumetry methodology:

1) Automatic/Adaptive Depth Layer Acquisition: Utilization of existing 3D field depth-detection cameras (and related and/or substantially equivalent hardware) during the 3D content capture/acquisition stage (or, as may be applicable during the initial intake stage of 2D content to be converted to 3D), to acquire a predetermined number of depth layers for the 3D content to form the desired layered "depth field environment" for each 3D content frame/scene, etc., which may be the same depth quantity for the entire container, or which, in accordance with the present invention, may dynamically, adaptively or selectively vary for different portions of the content (for example pursuant to one or more predetermined depth later variation profiles), 2) Dynamic Layer Density Assignment: Assignment of predetermined amounts of layers to various displayed objects in the 3D content being captured and/or converted. Optionally, the assignment process may utilize variable layer density (e.g., depending on relative depth of different parts of the objects). Alternately, an object's layer density distribution (or profile) may be shifted/adjusted dynamically as the object moves within the depth field.

3) Dynamic Focal Layer Determination/Tracking: Determination, tracking and use of at least one variable dynamically determined/adaptive "focal" layer (i.e., everything behind the focal layer needs less detail and less layer density, anything close needs more) for entire scenes, or for portions thereof.

4) Dynamic Multi-Layer Focal Objects/Scenes Determination/Tracking: Determination, tracking and/or use of different variable dynamically determined/adaptive "focal object" plural layers assigned to one or more objects in various 3D content scenes, and that can move to different depths depending on relative depth positions of the assigned object, thus enabling variable layer density across objects (essentially providing, to the inventive system 100, a control protocol for simplified manipulation of an object's depth layer distribution).

5) Assignment of Variable Spatial Resolution to Objects: In conjunction with one or more of the various features above, utilization of a mixture of different image resolution magnitudes (pixel density, etc.), and/or optionally of related image processing (anti-aliasing, etc.), for portions of objects/scene regions in an optimized manner (for example, by processing/displaying higher resolutions for those object layers that are closest to the viewer (or that otherwise would benefit from additional detail)).

6) Geospatial External Calibration: Optionally, maintaining a selected level of "geospatial accuracy" with external calibration distance points or with internal software reference markers, enables visual depth adjustment to precise geo-spatially accurate images to be accomplished to a degree as may be desired (or necessary) for one or more 3D content applications up to, and inclusive of, extremely dense layering across each 3D content scene and/or object(s) (for example as may be required for military, scientific, and/or medical applications, etc.).

7) Application of Dynamic Geospatial Survey Solutions in 3D Media Content Context: Utilization and/or adaptation of various advantageous geo-centric survey depth (elevation) mapping techniques and methodologies to various DBIR techniques utilized in accordance with the present invention, preferably with additional modifications applied thereto, to make them dynamic, adaptive, and highly configurable.

8) Additional Novel Tools and Techniques: Selective configuration, implementation, and use of various additional features including, but not limited to: dedicated 3D processing (D3DP) hardware (e.g., "black box") re-mastering/editing tools, depth correction techniques, various display/media player modules and editing tools, streamlining D3DP hardware rendering conversion processes (e.g., grayscale values to corresponding layer depth locking, and later image depth manipulation correction/optimization via grayscale value adjustments, etc.), and so forth.

It should also be noted that the various embodiments of the inventive system and method, can be advantageously configured, and/or adapted, to utilize and/or combine the very best of currently available (as well as any future) 3D-related solutions in an interoperable manner, that is as transparent as possible to the end user (whether the user is in the field of 3D content creation, or is part of the 3D content audience).

By way of example, the present invention may be implemented, in whole or in part, in connection with, or utilizing a 2D to 3D video conversion server (3DVC server), utilizing various additional applications and software-based tools. This technique may employ a variety of commercially available software tools designed to provide for some specific 2D to 3D conversion techniques such as separate interval field sequential frame grabbing, and thereafter mixing of the subsequent frames to create a depth map based on horizontal motion (which in itself is a sub-standard 3D conversion technique). However, when this approach, is integrated with a variety of other compatible 3D content enhancement techniques, and further assisted/upgraded by the aforementioned inventive system features and tools, it may be configured and implemented to perform at a substantially higher standard of 3D depth conversion, using one or more suitable DBIR solutions, and therefore become an excellent candidate for an inexpensive and easily to use basis for a Broadcast Quality 3D video standard. It should be noted that the opportunity to integrate a number of commercially available 2D to 3D video depth conversion methodologies with a 3DVC server exists only as a consequence of the implementation of the various novel depth mapping correction and relating techniques of the inventive system 100.

Therefore, the combination of the various commercially available 3D-related tools in concert with a 3DVC server, a media player, the various novel post-processing and display tools of the present invention, unexpectedly and advantageously resulted in the discovery of a completely unique and new process of image correction, 3D depth mapping, and depth impact optimization, that, when properly used and configured in accordance with the present invention are capable of elevating conventional 2D+Depth (i.e., DBIR) 3D media to Broadcast quality.

The various inventive depth mapping solutions and novel techniques, when applied to 3D content media provided by a conventional 3D 3DVC, unexpectedly result in a "remastering" of the 3DVC server, thus constituting an entirely new commercial application of a conventional 3D technology package "fused" with various novel solutions offered by the present invention, and therefore providing a breakthrough opportunity to produce 3D 2D+Depth stereoscopic 3D content media having maximum depth 3D visual impact, but without distracting visual artifacts.

In addition, it should be noted that while a conventional 3DVC server is most commonly used to convert 2D content to 2D+Depth 3D content utilizing one or more DBIR techniques, it is also capable of converting dual path stereoscopic optical signals to a 2D+Depth format (or equivalent thereof), and is also capable of converting stereoscopic side-by-side and field sequential stereoscopic 3D video, into a 2D+Depth format (or equivalent thereof). Fortunately, the various techniques and solutions of the present invention are fully applicable for advantageous utilization in connection with any and all of the aforementioned conversion formats which are supported by the 3DVC server.

Essentially the system and method of the present invention have gone one step further and readily serve as a basis for producing a 3D software solution (that may be optionally augmented with, or replaced by, a hardware component) that is capable of grabbing stereoscopic pairs from a nine multiview 2D+Depth conversion, and reformatting them back into a side-by-side, or a dual-path conventional 3D signal, for viewing the reformatted 3D content media using stereoscopic 3D glasses. Accordingly, the inventive techniques close the loop, and allow the use of a conventional 3DVC server to convert 2D content media not only into a 2D+Depth format, utilizing one or more DBIR techniques, but to also automatically convert 2D content media into highly desirable and commercially viable stereoscopic 3D medial content that is necessary for all 3D glasses-based display systems, large and small, thereby enabling a highly attractive and cost effective solution to be offered during the inevitable transition between from 3D glasses-based display systems to ASD systems.

When the above-described combined technology package (hereinafter referred to as a "3DF-3DVC system") is used with conventional and/or novel 3D display tool adjustments and settings, (which, in accordance with the present invention may be readily embedded into a 3D content media file (and optionally recorded/captured "on-the-fly")), the resulting output not only corrects any remaining 3D video image issues/flaws, but will at the same time provide the basis for development and implementation of various guidelines and tools for rapidly effecting a major increase in the impact of the depth perspective visuals in the display of various available and future 3D content media, thus establishing the methodology and infrastructure that is required for widespread production and proliferation of 3D stereoscopic video broadcast quality standards.

For example, various inventive 3DF-3DVC system techniques may be employed in all of 3DVC server applications to effectively upgrade the 3D content media quality through "Re-mastering". When these techniques are applied to pre-converted 2D+Depth, s3D 3D video clips, which may have been produced utilizing one or more DBIR techniques, and designed for display on conventional commercially available 3D ASD screens, advantageously, the issues of depth error correction, cone double image removal and ghosting artifacts may be corrected, and therefore eliminated.

As a result, in view of all of the above, the use of various embodiments of the inventive system and method (or of portions thereof), enables companies to offer, and consumers and other end-user parties to experience, 3D content media in a very cost-effective and efficient manner, thus overcoming the flaws and drawbacks of all prior 3D-related offerings that served as barriers to the well-deserved success of the 3D media experience market, and making inexpensive and ready availability of the "3D experience" a reality.

Thus, while there have been shown and described and pointed out fundamental novel features of the inventive system and method as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same gray to achieve the same results are within the scope of the invention. It is the intention, therefore, to be limited only as indicated by the scope of the claims appended hereto.

We claim:

1. A method, implemented in at least one data processing system, for improving the efficiency, quality, viewing comfort and/or visual impact of a 3D experience capable of being provided to at least one viewer of a 3D content media comprising a plurality of content sections, in conjunction with the use of at least a portion of a plurality of predetermined 3D content modification techniques, the method comprising the steps of:
    (a) identifying at least one content section of the 3D content media comprising at least one 3D media element and selecting at least one corresponding predefined plural 3D content modification technique that is configured for provision of optimum improvement of the 3D experience when applied thereto;
    (b) for each said selected at least one predefined plural 3D content modification technique configured for then-current application to said corresponding at least one 3D media element, applying said selected at least one predefined plural then-current 3D content modification technique thereto;
    (c) for each said selected at least one predefined plural 3D content modification technique configured for future application to said corresponding at least one 3D media element, determining a setting for at least one parameter of said selected at least one predefined plural future 3D content modification technique, optimal for application to said corresponding at least one 3D media element;
    (d) associating a reference to said selected at least one predefined plural future 3D content modification technique and said determined at least one optimal parameter, with said corresponding at least one 3D media element;
    (e) selectively repeating said steps (a), b), (c) and (d) for at east one additional section of the 3D content media;
    (f) selectively enabling an operator to view results of said steps (a), (b), (c), (d), and (e), and to at least one of: selectively cancel at least one result of at least one operation previously performed at least one of said steps (a), (b), (c), (d), and (e), and selectively change at least one operation previously performed at least one of said steps (a), (b), (c), (d), and (e), to an alternate operation selected by the operator;
    (g) after conclusion of said step (f), generating a dynamic 3D content media container file configured for playback to at least one viewer utilizing at least one 3D content playback system operable to apply said selected at least one predefined plural future 3D content modification technique to said corresponding at least one 3D media element in accordance with said at least determined at least one optimal parameter, and further configured to store, for each 3D content media element identified at said step (a), at least one of:
        at least one immediate 3D content modification applied at said step (b), and
        at least one said associated reference to said at least one corresponding predefined plural future 3D content modification technique, and said determined at least one optimal parameter therefor;

such that said dynamic 3D content media container file comprises 3D media content having at least one modified content section each comprising at least one modification specifically optimal for application thereto, thereby maximizing the efficiency, quality, viewing comfort and/or visual impact of the 3D experience being provided to viewers thereof during playback.

2. The method of claim 1, for improving the efficiency, quality, viewing comfort, and/or visual impact of the 3D experience, wherein the 3D content media comprises at least one of stereoscopic 3D content, and auto-stereoscopic 3D content.

3. The method of claim 1, for improving the efficiency, quality, viewing comfort, and/or visual impact of the 3D experience, wherein the 3D content media comprises at least one of first 3D content media previously captured by at least one 3D content capture system, second 3D content media previously generated by at least one 3D content source, third 3D content media previously converted, by a 3D content capture system from captured 2D media content, and fourth 3D content media previously converted, by a 3D content source, from previously generated 2D content.

4. The method of claim 1, for improving the efficiency, quality, viewing comfort, and/or visual impact of the 3D experience, wherein said at least one content section of the 3D content media, identified at said step (a), comprises a plurality of content frames comprising said at least one 3D media element.

5. The method of claim 4, for improving the efficiency, quality, viewing comfort, and/or visual impact of the 3D experience, wherein said predefined plural content frames comprise a corresponding scene, and wherein each said at least one 3D media element comprises at least cine of a static 3D displayed object, and a moving 3D displayed object.

6. The method of claim 1, for improving the efficiency quality, vie raring comfort, and/or visual impact of the 3D experience, wherein at least one of said steps (a), (b), (c), (d) and (e), is performed by the at least one data processing system under manual control of an operator.

7. The method of claim 1, for improving the efficiency, quality, viewing comfort, and/or visual impact of the 3D experience, wherein said at least one 3D content playback system comprises at least one of: a 3D content media player operable to process said dynamic 3D content media container file for playback by generating therefrom and transmitting a 3D content output signal to a corresponding connected 3D content display system, and a 3D content display system operable to process said dynamic 3D content media container file for playback by generating therefrom, and displaying said 3D content output signal.

8. The method of claim 7, wherein said at least one 3D content playback system is operable to apply each said at least one predefined plural future 3D content modification technique to said corresponding at least one 3D media element of said 3D content media, in accordance with said at least one optimal parameter therefor, further comprising the steps of:
    (h) providing said dynamic 3D content media container file, generated at said step (f), to said at least one 3D content playback system;
    (i) identifying, by said at least one 3D content playback system in said dynamic 3D content media container file, at least one said associated reference to said at least one corresponding predefined plural future 3D content modification technique, and said determined at least one optimal parameter therefor; and (j) applying said at least one referenced corresponding predefined plural future 3D content modification technique to said corresponding at least one 3D media element of said 3D content media, in accordance with said at least one optimal parameter therefor.

9. The method of claim 1, for improving the efficiency, quality, viewing comfort, and/or visual impact of the 3D experience, wherein said plurality of predetermined 3D content modification techniques further comprises a plurality of content modification techniques operable to optimize at least one additional visual characteristic of 3D content media, further comprising the steps of, prior to said step (e):
(k) identifying at least one content section of the 3D content media comprising at least one visual characteristic, and selecting at least one corresponding predefined plural content modification technique that is configured for provision of optimum improvement of the 3D experience when applied thereto; and
(l) for each said selected at least one predefined plural content modification technique configured for immediate application to said corresponding at least one content section applying said selected at least one predefined plural immediate content modification technique thereto.

10. The method of claim 9, wherein said step (e) further comprises the step of:
(m) selectively repeating said steps (k) and (l) for at least one additional section of the 3D content media.

11. The method of claim further comprising the steps of, after said step (k) and prior to said step (e):
(n) for each said selected at least one predefined plural content modification technique configured for future application to said corresponding at least one content section, determining a setting for at least one parameter of said selected at least one predefined plural future content modification technique, optimal for application to said corresponding at least one content section; and
(o) associating a reference to said selected at least one predefined plural future content modification technique and said determined at least one optimal parameter, with said corresponding at least one content section.

12. The method of claim herein said step (e) further comprises the step of:
(p) selectively repeating said steps (n) and (o) for at least one additional section of the 3D content media.

13. The method of claim 11, wherein said at least one 3D content playback system is operable to apply said at least one corresponding predefined plural future content modification technique to at least one predetermined content section of said 3D content media, in accordance with said at least one optimal parameter therefor, further comprising the steps of:
(q) providing said dynamic 3D content media container file, generated at said step (f), to said at least one 3D content playback system;
(r) identifying, by said at least one 3D content playback system in said dynamic 3D content media container file, at least one said associated reference to said at least one corresponding predefined plural future content modification technique, and said determined at least one optimal parameter therefor; and
(s) applying said at least one referenced corresponding predefined plural future content modification technique to at least one predetermined content section of said 3D content media, in accordance with said at least one optimal parameter therefor.

14. The method of claim 1, wherein said step (q) comprises the step of:
(t) streaming said dynamic 3D content media container file, generated at said step (f), to said at least one 3D content playback system from a remote 3D content source.

15. The method of claim 13, wherein said dynamic 3D content media container file is stored on physical media operable to store 3D content media container files, and wherein step (q) comprises the step of:
(u) transmitting said dynamic 3D content media container file, generated at said step (f), to said at least one 3D content playback system from said corresponding physical media.

16. The method of claim 1, for improving the efficiency, quality, viewing comfort, and/or visual impact of the 3D experience, wherein the at least one data processing system operable to perform said steps (a), (b), (c), (d), and (e), is connected to said at least one 3D content playback system.

17. The method of claim 1, for improving the efficiency, quality, viewing comfort, and/or visual impact of the 3D experience, wherein said at least one 3D content playback system comprises the at least one data processing system operable to perform said steps (a), (b (c), (d), and (e).

18. The method of claim 1, for improving the efficiency, quality, viewing comfort, and/or visual impact of the 3D experience, wherein the at least one data processing system is operable to perform said steps (a), (b), (c), (d), (e), and (f), prior to playback of said dynamic 3D content media container file, further comprising the step of:
(v) after said step (f), storing said dynamic 3D content media container file, on physical media operable to store 3D content media container files, for later playback by said at least one 3D content playback system.

19. The method of claim 1, for improving efficiency, quality, viewing comfort, and/or visual impact of the 3D experience, wherein the at least one data processing system is operable to perform said steps (a), (b), (c), (d), (e), and (f), in conjunction with playback of said dynamic 3D content media container file by said at least one 3D content playback system.

* * * * *